United States Patent
Marek et al.

(10) Patent No.: US 7,640,433 B1
(45) Date of Patent: Dec. 29, 2009

(54) MILS NETWORK USING COTS SWITCHES

(75) Inventors: James A. Marek, Anamosa, IA (US);
Sung J. Kim, Iowa City, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 809 days.

(21) Appl. No.: 11/045,454

(22) Filed: Jan. 28, 2005

(51) Int. Cl.
*H04L 9/32* (2006.01)
(52) U.S. Cl. .................................. 713/181; 726/30
(58) Field of Classification Search ............... 713/181, 713/170; 380/29; 707/534; 709/228, 201; 434/30; 726/30
See application file for complete search history.

(56) References Cited

U.S. PATENT DOCUMENTS

| 4,159,468 | A  | * | 6/1979  | Barnes et al. | 713/181 |
| 4,160,120 | A  | * | 7/1979  | Barnes et al. | 380/29  |
| 6,478,581 | B1 | * | 11/2002 | Lin           | 434/30  |
| 6,941,460 | B2 | * | 9/2005  | Carro et al.  | 713/170 |
| 2002/0013794 | A1 | * | 1/2002 | Carro et al.  | 707/534 |
| 2002/0198848 | A1 | * | 12/2002 | Michener     | 705/75  |
| 2004/0008669 | A1 | * | 1/2004  | Bos et al.   | 370/352 |
| 2005/0132070 | A1 | * | 6/2005  | Redlich et al. | 709/228 |
| 2005/0138110 | A1 | * | 6/2005  | Redlich et al. | 709/201 |

OTHER PUBLICATIONS

John R. Murdock; Open Systems Avionics Network to Replace MIL-STD-1553; Year: 2001; IEEE; p. 1-5.*

* cited by examiner

*Primary Examiner*—Kambiz Zand
*Assistant Examiner*—Monjour Rahim
(74) *Attorney, Agent, or Firm*—Matthew J. Evans; Daniel M. Barbieri

(57) ABSTRACT

The present invention is a MILS network system employing functional separation of messages without customized switches. The MILS network system may maintain separation of data while eliminating a requirement of full message encryption. In an embodiment of the invention, a function may be employed whereby a keyed digest of a message is created. The function may receive a message and a key, and may emit a keyed digest value. The key may be representative of a particular level of security, thus promoting the separation of data. Messages may include an embedded keyed digest when sent through a switch to a MILS node. At the MILS node, the keyed digest may be recalculated, if it matches, the message may be passed to a host.

4 Claims, 4 Drawing Sheets

MILS NETWORK USING COTS SWITCHES

FIELD OF THE INVENTION

This invention relates generally to communication networks and more particularly to multiple independent levels of security networks.

BACKGROUND OF THE INVENTION

Communication networks provide the ability to transfer, retrieve and access data. A problem associated with communication networks known to the art is security. For example, conventional communication networks may be subject to interception of data. A solution for data interception is encryption whereby transferred data is encrypted prior to transport and decrypted upon retrieval of the data at the desired destination. A problem associated with encryption of data is the significant increase in overhead to the communication network.

Additionally, conventional communication systems require separate and unique hardware for transmission of data across distinct classification domains. For example, the present Fibre Channel standard architecture requires "top secret" processing, nodes, switches, graphics and secret instantiations and unclassified instantiations. Maintaining such separation in a closed computing platform causes significant overhead in components and costs because separate hardware and components are required for each classification domain.

Multiple independent levels of security (MILS) networks provide multiple levels of security for transfer of data. A MILS network is a highly assured communication system which may separate security mechanisms and concerns into manageable components. Advantageously, MILS networks may provide for secure separation of data into levels without the requirement of full message encryption. Additionally, MILS networks may reduce the number of switches, and may support additional levels of integration through a MILS real-time operating system (RTOS) while not requiring full encryption of data.

Referring to FIG. 1, a block diagram of a MILS network 100 known to the art is shown. The MILS network 100 may include a MILS switch 110, a MILS nodes 120, 130 and hosts 140, 150. Transfer of messages from host 140 to host 150 may be effectuated through nodes 120, 130 and MILS switch 110. MILS switch 110 ensures separation of data according to the classification domain. A problem associated with MILS networks 100 known to the art is the amount of customized hardware required to support the MILS computing network infrastructure. The use of customized hardware, such as MILS switch 110, increases the overall system cost and certification cost.

Consequently, a MILS network system which maintains secure separation of data and secure data transfer while reducing the requirement of customized hardware is necessary.

SUMMARY OF THE INVENTION

Accordingly, the present invention is directed to a MILS network system employing functional separation of messages without customized switches. Advantageously, the MILS network system of the present invention may maintain separation of data while eliminating a requirement of full message encryption. In an embodiment of the invention, a function may be employed whereby a keyed digest of a message is created. The function may receive a message and a key, and may emit a keyed digest value. The key may be representative of a particular level of security, thus promoting the separation of data. Messages may include an embedded keyed digest when sent through a switch to a MILS node. At the MILS node, the keyed digest may be recalculated, if it matches, the message may be passed to the host.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

Those numerous objects and advantages of the present invention may be better understood by those skilled in the art by reference to the accompanying figures in which.

DETAILED DESCRIPTION OF THE INVENTION

Reference will now be made in detail to presently preferred embodiments of the invention, examples of which are illustrated in the accompanying drawings.

Figure 1:
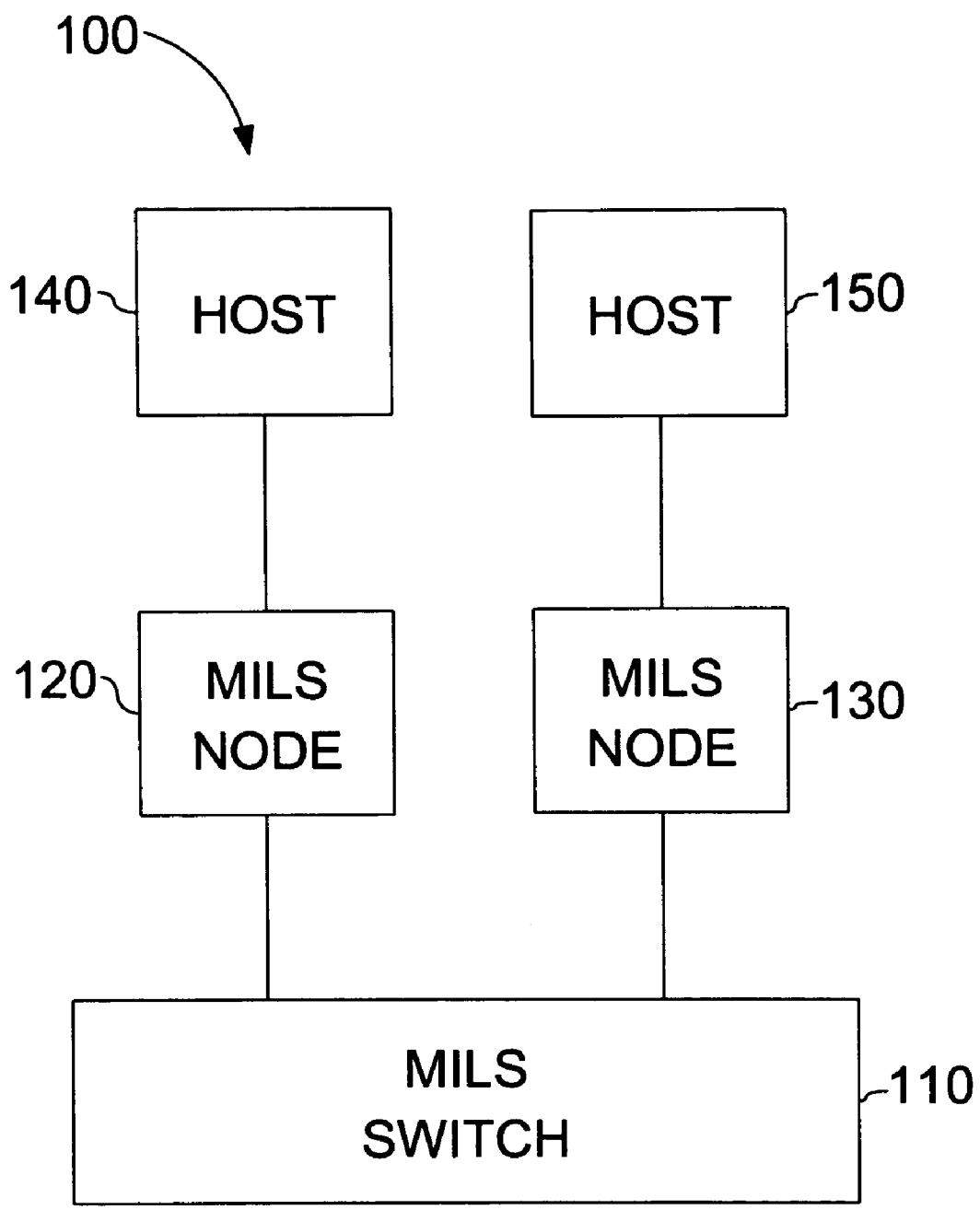
FIG. 1 depicts a block diagram of a MILS network known in the art.
Figure 2:
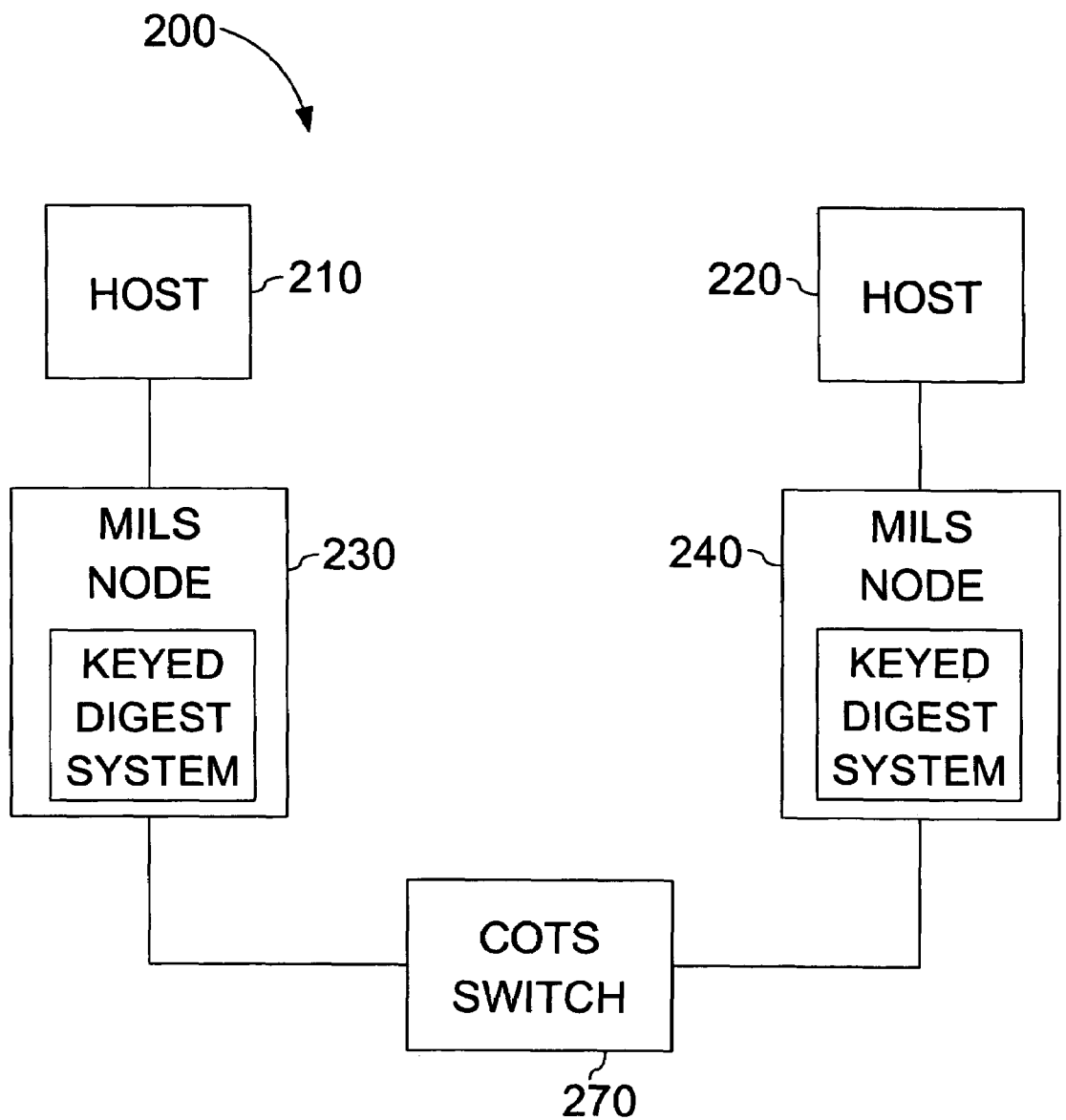
FIG. 2 depicts a block diagram of a MILS network in accordance with an embodiment of the present invention.

Referring to FIG. 2, a block diagram of a MILS network 200 in accordance with an embodiment of the present invention is shown. MILS network 200 may include hosts 210, 220, MILS nodes 230, 240 and a switch 270. MILS nodes 230, 240 may include a keyed digest system. MILS network 200 may ensure separation of data into classification domains without the requirement of customized hardware, such as a MILS switch. Advantageously, since keyed digest systems ensure separation of data, switch 270 may be a commercial-off-the-shelf (COTS) switch. Keyed digest systems may operate in combination with MILS nodes and switch 270 to reduce system cost and certification cost for the MILS network 200.

Messages which are passed between hosts 210, 220 may be embedded with a keyed digest. A keyed digest system may operate to ensure separation of the data without the requirement of a MILS switch. A transmitted message may be embedded with a keyed digest, may pass through the switch 270 and the receiving MILS node may receive the message with the embedded keyed digest. For example, host 210 may transfer a message through MILS node 230. The message may be passed through the keyed digest system via the MILS node 230. The output of the keyed digest system may be a message with an embedded keyed digest. Switch 270 may transfer the message to MILS node 240. MILS node 240 may recalculate the keyed digest via the keyed digest system and may compare the calculated keyed digest with the results of the received keyed digest. If the calculated keyed digest matches the received keyed digest, the message may be passed to the host 220. If the calculated keyed digest does not match the received keyed digest, the message may not be passed. Additionally, the message may be flagged and an error condition may be logged.

Figure 3:
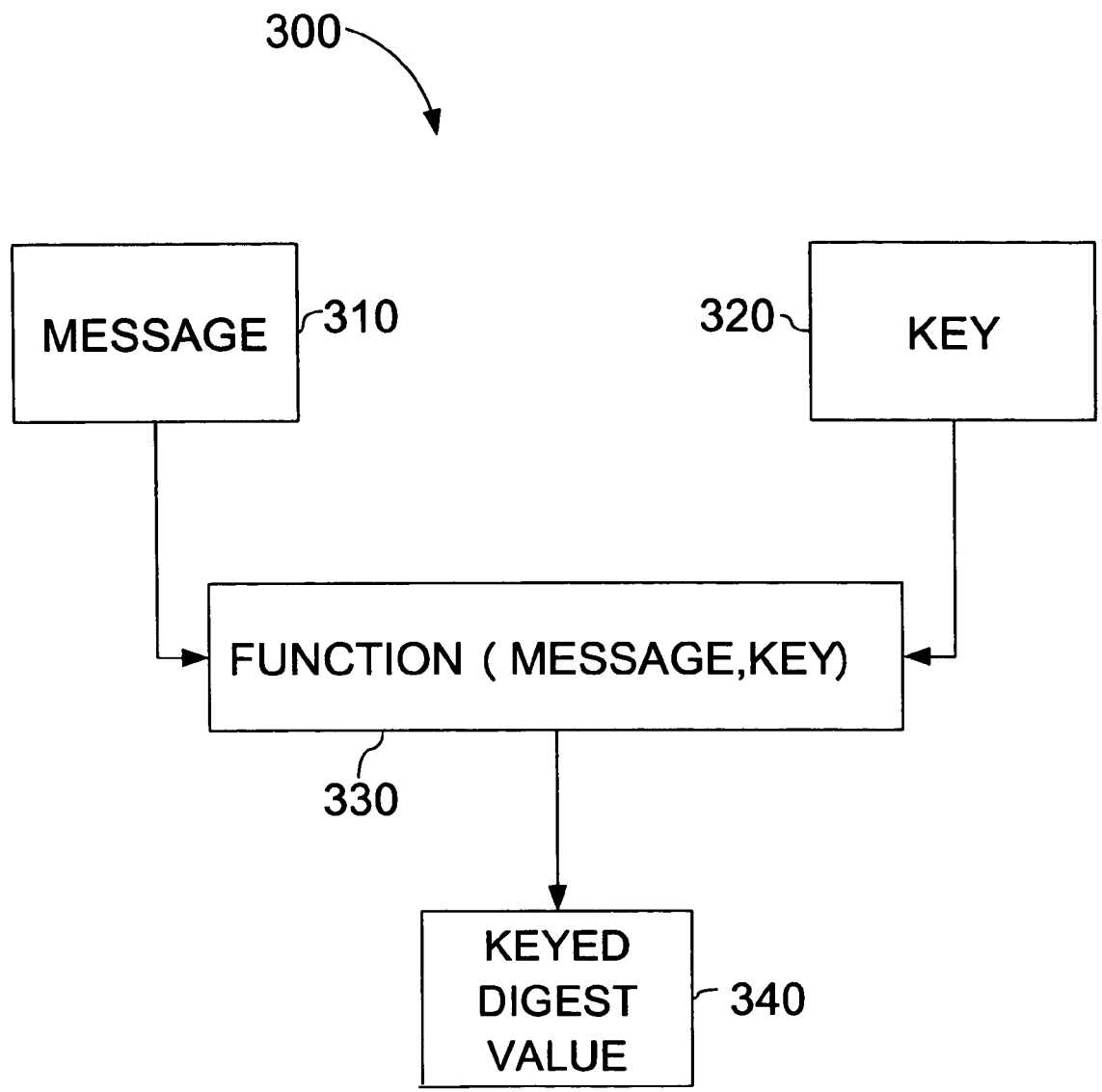
FIG. 3 depicts a flow diagram of a process for creating a keyed digest of a message in accordance with an embodiment of the present invention.

Referring to FIG. 3, a flow diagram of a process 300 for creating a keyed digest of a message in accordance with an embodiment of the present invention is shown. A message 310 and a key 320 may be inputs to a function 330 which may output a keyed digest value 340. In an embodiment of the invention, the size of the keyed digest value 340 may be significantly smaller than the size the message. Keys may refer to a number of unique classification domains which remain separate. For example, three different keys may be provided which may refer to a top secret domain, a secret domain and an unclassified domain. However, it is contemplated that any number of keys may be provided to account for different numbers of domain classifications.

Keyed digest systems of MILS nodes 230, 240 of FIG. 2 may implement process 300 for creating a keyed digest of a message in accordance with an embodiment of the present invention. For example, a keyed digest system may receive a message via MILS node 230 and key information regarding the classification domain. It is contemplated that MILS nodes 230, 240 may be configured with key information and may provide the appropriate key to the keyed digest system. Additionally, a key management infrastructure may distribute keys to the MILS nodes 230, 240, the key information being encrypted. The Keyed digest system may produce the keyed digest value based upon the message and the key information. It is contemplated that keyed digest system may be implemented in software, hardware, firmware or a combination of software, hardware, firmware by those with ordinary skill in the art.

In an advantageous aspect of the present invention, all nodes 230, 240 of the MILS network 200 of FIG. 2 may operate according to a similar keyed digest system, for example, process 300 of FIG. 3. For example, each node may be configured with key information or may receive keys via a key management infrastructure. Thus, each node may be capable of performing process 300 whereby the keyed digest value is recalculated to determine if the recalculated keyed digest value matches the keyed digest value embedded within the message. MILS nodes 230, 240 of FIG. 2 may only pass messages when the recalculated keyed digest value matches the embedded keyed digest value. Since all MILS nodes may operate according to a similar scheme, encryption of messages may also be reduced.

Figure 4:
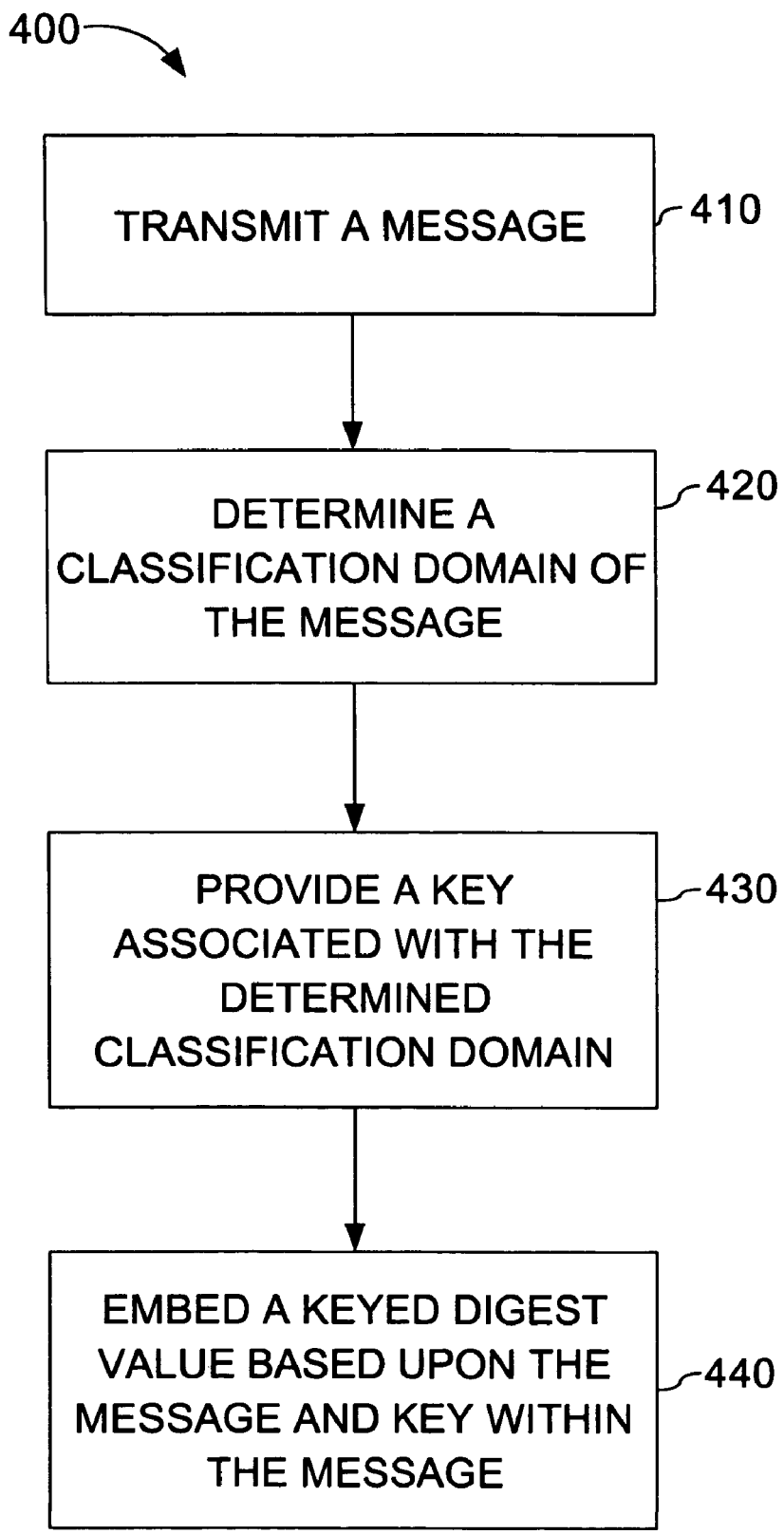
FIG. 4 depicts a process for maintaining separation of messages within a MILS network.

Referring to FIG. 4, a process 400 for maintaining separation of messages within a MILS network is shown. Process 400 may be implemented by MILS network 200 of FIG. 2. Process 400 may begin upon the transmission of a message 410. The classification domain associated within the message may be determined 420. For example, the message may be determined to be top secret, secret or unclassified. A key may be provided 430 whereby the key is based upon the determined classification domain. Thus, if the classification domain of the message is secret, the key associated with a secret classification domain may be provided. The number of classification domains operated within the MILS network may be equal to the number of keys available. A keyed digest value may be embedded within the message based upon the message and the key 440. In an embodiment of the invention, embedding the keyed digest value may be similar to process 300 of FIG. 3. Advantageously, a node of the MILS network may only allow transfer of the message if the embedded keyed digest value matches a calculated keyed digest value of the node. The message may not be transferred if the calculated keyed digest value of a node does not match the keyed digest value embedded within the message. Additionally, an error condition may be reported and logged when if the calculated keyed digest value of a node does not match the keyed digest value embedded within the message.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A multiple independent levels of security (MILS) network, comprising:
   a first host;
   a second host;
   a first MILS node coupled to said first host, said first MILS node including
   a first keyed digest system;
   a second MILS node coupled to said second host, said second MILS node including a second keyed digest system; and
   a commercial-off-the-shelf switch coupled to said first and second MILS nodes, said commercial-off-the-shelf switch passing a transmitted message, said transmitted message being one of an unclassified classification domain, secret classification domain and top secret classification domain, wherein said first keyed digest system receives said transmitted message via said first MILS node and produces a keyed digest value embedded within said transmitted message, said first and second keyed digest system employing a key, said key being encrypted, said key being representative of a same classification domain as said a classification domain of the transmitted message, said keyed digest value being of a data size less than a data size of said transmitted message, said transmitted message being passed by said commercial-off-the-shelf switch to said second MILS node, said second MILS node allowing transfer of said transmitted message to said second MILS host if a recalculated keyed digest value matches said keyed digest value embedded within said transmitted message.

2. The network as claimed in claim 1, wherein said key is produced by one of said first MILS node or said second MILS node.

3. The network as claimed in claim 1, wherein a transmitted message is not passed to said second host by said second MILS node if said recalculated keyed digest value does not match said keyed digest value embedded within said transmitted message.

4. The network as claimed in claim 3, wherein an error condition is logged when said recalculated keyed digest value does not match said keyed digest value embedded within said transmitted message.

* * * * *